(12) United States Patent
Holmgaard et al.

(10) Patent No.: US 9,825,452 B2
(45) Date of Patent: Nov. 21, 2017

(54) APPARATUS FOR DETECTING ARC FLASH

(71) Applicant: LITTELFUSE, INC., Chicago, IL (US)

(72) Inventors: Niels Holmgaard, Frederiksberg (DK); Jakob Seedorff, Vaerlose (DK)

(73) Assignee: Littelfuse, Inc., Chicago, IL (US)

( * ) Notice: Subject to any disclaimer, the term of this patent is extended or adjusted under 35 U.S.C. 154(b) by 319 days.

(21) Appl. No.: 14/801,158

(22) Filed: Jul. 16, 2015

(65) Prior Publication Data

US 2017/0018917 A1    Jan. 19, 2017

(51) Int. Cl.
   *H02H 1/00* (2006.01)
   *G01J 1/44* (2006.01)

(52) U.S. Cl.
   CPC ............ *H02H 1/0023* (2013.01); *G01J 1/44* (2013.01)

(58) Field of Classification Search
   CPC .. H02H 1/0015; H01L 2924/00; H01H 9/542; H01H 2071/008
   USPC .................................................. 361/2–5, 42
   See application file for complete search history.

(56) References Cited

U.S. PATENT DOCUMENTS

| | | | |
|---|---|---|---|
| 7,586,718 B1* | 9/2009 | Radosavljevic | ....... H01H 83/04 361/42 |
| 2010/0073831 A1* | 3/2010 | Schweitzer, III | .. G01R 31/1218 361/42 |
| 2010/0328824 A1* | 12/2010 | Roscoe | ................ H02H 1/0023 361/42 |

\* cited by examiner

*Primary Examiner* — Dharti Patel

(57) ABSTRACT

An apparatus may include a sensor housing, a light sensor disposed within the sensor housing, the light sensor arranged to generate a detection signal when light impinges on the light sensor, a sensor lens disposed at least partially outside the sensor housing, wherein a distal portion of the sensor lens extends a first distance above the sensor housing, the sensor lens being transparent, wherein light received from outside the sensor housing is transmitted to the light sensor; and a light emitter assembly disposed outside the sensor housing at a second distance above the housing less than the first distance.

20 Claims, 6 Drawing Sheets

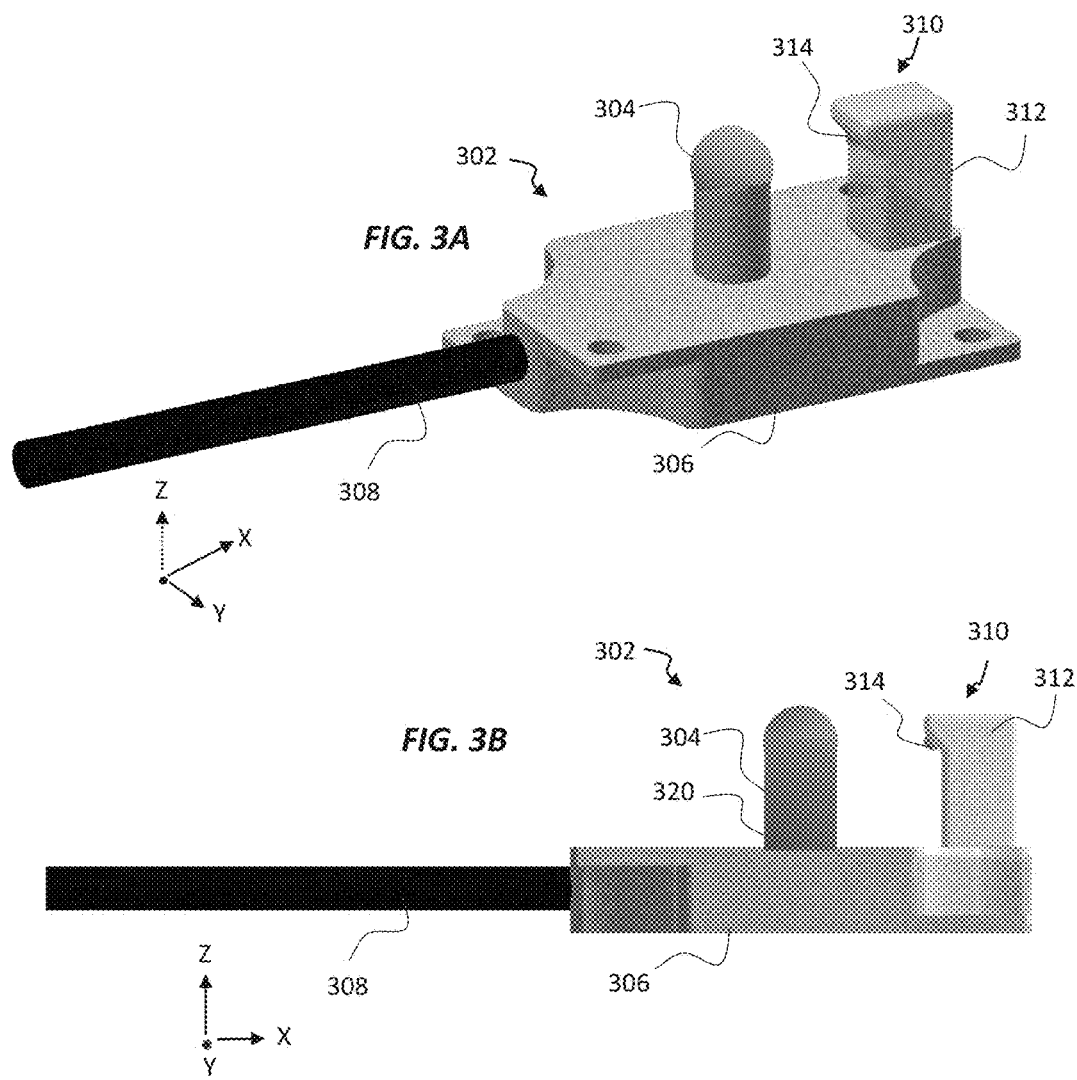

… (1)

APPARATUS FOR DETECTING ARC FLASH

FIELD OF THE DISCLOSURE

This disclosure relates generally to circuit protection equipment and more particularly to apparatus to detect arc flashes.

BACKGROUND OF THE DISCLOSURE

An arc flash occurs during an arc fault, a type of electrical fault resulting from an insulation breakdown or an unintended low impedance connection to ground or to another voltage phase in an electrical system.

In order to limit damage caused by an arc fault, rapidly detecting an arc flash is useful so that protective measures may be taken for equipment experiencing an arc fault. Modern arc fault protection equipment may be deployed for mitigation of arc faults in motor control centers, transformer systems, power converters, wind turbines electrical switchboards, and the like.

By detecting the light from an arc flash, an arc fault protection apparatus may be used to rapidly terminate an arc fault condition. For example, an arc fault sensor may be arranged to detect an arc flash in equipment powered by a given electrical line, and may be arranged to send signals to trip a circuit breaker or other device to interrupt power on the electrical line.

Known arc flash detectors may include a sensor to sense light emitted from an arc flash. In order to ensure proper operation, an arc fault protection apparatus may be configured to send a signal to an apparatus, such as a circuit breaker, when a threshold amount of light radiation is detected by a sensor. During use, the sensor may be exposed to ambient conditions causing dirt, dust, or other material to accumulate on the sensor. This accumulation may result in the attenuation of light incident on the sensor, resulting in failure to detect an arc flash incident.

It is with respect to the above the present disclosure is provided.

BRIEF SUMMARY

In one embodiment, an apparatus may include a sensor housing; a light sensor disposed within the sensor housing, the light sensor arranged to generate a detection signal when light impinges on the light sensor; a sensor lens disposed at least partially outside the sensor housing, wherein a distal portion of the sensor lens extends a first distance above the sensor housing, the sensor lens being transparent, wherein light received from outside the sensor housing is transmitted to the light sensor; and a light emitter assembly disposed outside the sensor housing and arranged to extend a second distance above the housing less than the first distance.

In another embodiment, an arc flash protection device may include an arc flash relay having a receiving component to receive a detection signal and a shutoff component to terminate conduction through a conduction line when a value of the detection signal exceeds a threshold; and an arc flash sensor. The arc flash sensor may include a sensor housing; a light sensor disposed within the sensor housing, the light sensor arranged to generate the detection signal when light impinges on the light sensor; a sensor lens disposed at least partially outside the sensor housing, wherein a distal portion of the sensor lens extends a first distance above the sensor housing, the sensor lens being transparent, wherein light received from outside the sensor housing is transmitted to the light sensor; and a light emitter assembly disposed outside the sensor housing and arranged to extend a second distance above the housing less than the first distance.

In a further embodiment, a method of protecting a component against an arc flash may include providing a light sensor within a sensor housing, the light sensor arranged to generate a detection signal when light impinges on the light sensor; providing a sensor lens at least partially outside the sensor housing, wherein a distal portion of the sensor lens extends a first distance above the sensor housing, the sensor lens being transparent, wherein light received from outside the sensor housing is transmitted to the light sensor; providing a light emitter outside the sensor housing, the light emitter extending a second distance above the housing less than the first distance; and generating a test signal from the light emitter, wherein the test signal is received by the light sensor.

BRIEF DESCRIPTION OF THE DRAWINGS

By way of example, specific embodiments of the disclosed device will now be described, with reference to the accompanying drawings, where:

FIG. 3A is perspective view of another arc flash sensor apparatus according to embodiments of the present disclosure;

FIG. 3B is a side view of the arc flash sensor apparatus of FIG. 3A;

DETAILED DESCRIPTION

The present disclosure provides various apparatus including a novel arc flash sensor apparatus. The present disclosure also provides arc flash protection devices including novel arc flash sensors. In various embodiments, an arc flash sensor design is provided, where the arc flash sensor facilitates periodic checking of sensor integrity using a light emitter disposed outside a sensor housing. The light emitter may be arranged to generate a light signal, such as a test signal, where the test signal is transmitted via a sensor lens to a light sensor disposed within the sensor housing. Because the light emitter is disposed outside the sensor housing, a test signal received by the light sensor may be used to determine the state of the sensor lens, such as when dirt, dust, smudges, or other material has accumulated on the sensor lens.

Figure 1:
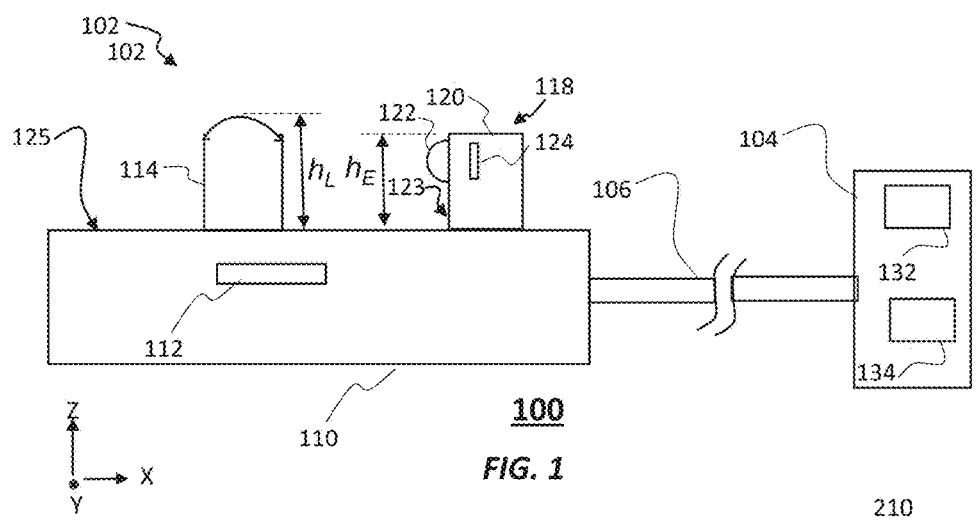
FIG. 1 is side view of an arc flash protection device according to embodiments of the present disclosure.

FIG. 1 is side view of an arc flash protection device 100 according to embodiments of the present disclosure. The arc flash protection device 100 may include an arc flash sensor 102 and arc flash relay 104. The arc flash sensor 102 may be arranged to detect an arc flash occurring near the arc flash sensor 102. The arc flash sensor 102 maybe deployed proximate a component to be protected, such as a transformer system, power converter, switchgear, and the like. The embodiments are not limited in this context. The arc flash sensor 102 may detect light emitted from an arc flash and may generate a detection signal received by the arc flash relay 104. The arc flash protection device 100 further includes a signal line 106 connected to the arc flash sensor 102 and to the arc flash relay 104. In some embodiments, the signal line 106 may be an electrical cable including at least one electrically conductive wire. The embodiments are not limited in this context. The arc flash relay 104 may have a shutoff component (not separately shown) to terminate conduction of electrical current through an external conduction line powering a device to be protected. Accordingly, when the arc flash relay 104 receives a detection signal from the arc flash sensor 102, the arc flash relay may cut power to a given conduction line, for example, when a value of the detection signal exceeds an arc flash detection threshold.

The arc flash sensor 102 may include a sensor housing 110, where the sensor housing 110 houses a light sensor 112. The light sensor 112 may, in various embodiments, include electronic components to sense radiation in the visible range, near infrared range, near ultraviolet range, for example. In various embodiments, the light sensor 112 may be a known photovoltaic chip arranged to convert incident light radiation into an electric current. As further shown in FIG. 1, the arc flash sensor 102 may include a sensor lens 114, where the sensor lens 114 is disposed at least partially outside the sensor housing 110. The sensor lens 114 may be transparent to light in the visible range, infrared range, near ultraviolet range, or a combination of these ranges, wherein light is transmitted from outside the sensor housing to the light sensor 112. Details of variants of the sensor lens 114 are provided below.

When light is received by the light sensor 112, such as light from an arc flash, the light sensor 112 may generate a detection signal as an electric current conducted along the signal line 106 when light impinges upon the light sensor 112.

The arc flash sensor 102 may further include a light emitter assembly 118, where the light emitter assembly 118 is disposed outside the sensor housing 110. The light emitter assembly 118 may include a light emitter housing 120, a light emitting diode 124 disposed within the light emitter housing 120, and a light emitter lens 122 disposed on the light emitter housing 120. In other embodiments, a light emitter lens and light emitting diode may be integrated into a common component. Additionally, in some embodiments, the light emitting diode 124, while covered by the light emitter lens 122, may at least partially be disposed outside of the main portion of the light emitter housing 120, as defined by the surface 123.

As detailed below with respect to further embodiments, the light emitter lens 122 may be transparent to light emitted as a test signal, wherein the test signal is transmitted through the light emitter lens. For example, a component, such as the light emitting diode 124 and related test circuitry connected to the light emitting diode, may be arranged to generate a test signal, such as a periodic test signal. Notably, in this embodiment and others to follow, a sensor housing, such as sensor housing 110, may be opaque to light emitted by the light emitter assembly 118 or similar assembly, as well as light emitted in an arc flash.

As suggested by FIG. 1, the light emitter lens 122 may be disposed in a line-of-sight relationship with the sensor lens 114, wherein the test signal is transmitted by the sensor lens to the light sensor 112.

The arc flash protection device 100 may further include a circuit check arrangement having a test signal component 134 to cause the light emitter assembly 118 to periodically emit the test signal; and a failure component 132 to generate a failure signal when an intensity of light from the test signal detected by the light sensor 112 falls below a threshold value. This may be determined from the amount of current generated by the light sensor 112 when a test signal is generated by the light emitter assembly 118, conducted through the sensor lens 114 and impacting the light sensor 112. For example, when the sensor lens 114 is in a clean condition, having little or no dust, dirt, or other material on its surface, a test signal of predetermined intensity generated by the light emitter assembly 118 may be pre-calibrated to generate a predetermined response by the light sensor 112. This predetermined response may result from conduction of the test signal of a predetermined intensity to the light sensor 112 through the sensor lens 114, where the sensor lens 114 in clean condition has a first attenuation of the test signal. The first attenuation results in a test signal of a second intensity striking the light sensor and generating the predetermined response, where the predetermined response may have a value above the threshold value. When the sensor lens 114 is covered at least in part by material such as dirt, dust, or other material, the attenuation of the test signal may be larger, resulting in light having a third intensity striking the light sensor 112. If the third intensity falls below the threshold value, the failure component 132 may generate a failure signal, indicating maintenance of the arc flash sensor 102, in particular of the sensor lens 114, is to be performed. In this manner, the sensor lens 114 may be kept in a clean condition, avoiding scenarios where an arc flash is not detected or is detected with too much delay because of excessive attenuation of light from the arc flash by a dirty sensor lens. As illustrated in FIG. 1, the test signal component 134 and failure component 132 may be located in the arc flash relay 104. In other embodiments, the test signal component 134 and failure component 132 may be located in the sensor housing 110. When located within the arc flash relay 104, the circuit check arrangement may be capable of testing the optical and electrical path from the test signal component 134 through the signal line 106, out through the light emitter assembly 118 and into the sensor lens 114, down to the light sensor 112 and back through the signal line 106. A failure in any of these components may thus be detected.

In accordance with various embodiments of the disclosure, the sensor lens 114 may be arranged to extend a first distance above the sensor housing 110, shown as $h_L$, while the light emitter assembly 118 is arranged to extend a second distance above the sensor housing 110, shown as $h_E$, where the second distance is less than the first distance. As detailed below, this configuration may allow efficient collection of light generated from outside the sensor housing 110 by the sensor lens 114, since the light emitter assembly 118 provides just a small shadowing of any light otherwise incident on the sensor lens 114. Furthermore, in accordance with additional embodiments, the shape of the sensor lens 114, or variants thereof, may be arranged to collect light in an efficient and uniform manner.

Figure 2A:
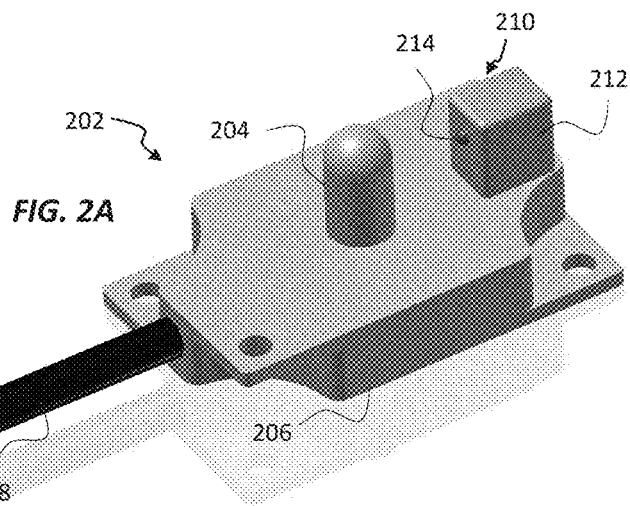
FIG. 2A is perspective view of an arc flash sensor apparatus according to embodiments of the present disclosure.
Figure 2B:
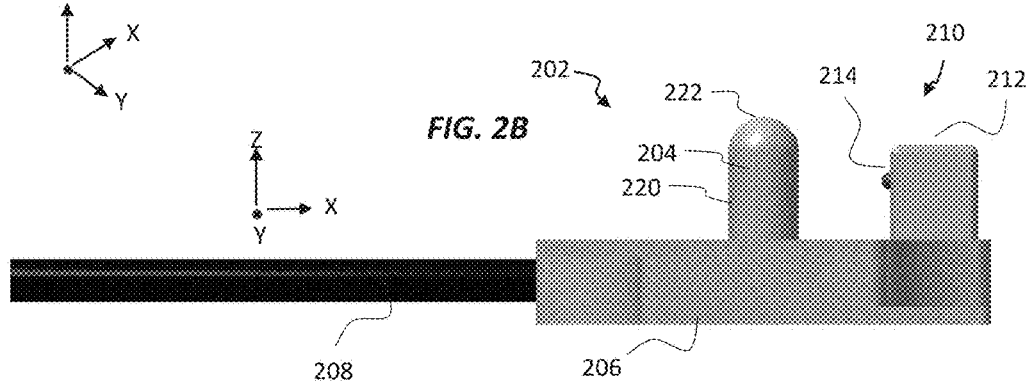
FIG. 2B is a side view of the arc flash sensor apparatus of FIG. 2A.

FIG. 2A is perspective view of an arc flash sensor apparatus according to embodiments of the present disclosure, while FIG. 2B is a side view of the arc flash sensor apparatus of FIG. 2A. In particular, an arc flash sensor 202 is shown, coupled to a signal line 208. The arc flash sensor 202 may include a sensor housing 206, where the sensor housing 206 is formed by a molding process. The embodiments are not limited in this context. The sensor housing 206 may include a light sensor as described above with respect to FIG. 1, where the light sensor is used to detect an arc flash. The arc flash sensor 202 further includes a sensor lens 204 disposed on the outside of the sensor housing 206. The sensor lens 204, in this embodiment, may have a cylindrical shape. The arc flash sensor 202 further includes a light emitter assembly 210 disposed outside the sensor housing 206. The light emitter assembly 210 is disposed on a same side of the sensor housing 206 as the sensor lens 204 and in a line-of-sight relationship with the sensor lens 204. The light emitter assembly 210 may include a light emitting diode with the light emitter housing 212, as described above with respect to FIG. 1. The light emitter assembly 210 may include a light emitter lens 214 facing the sensor lens 204. The light emitter assembly 210 may function as described with respect to light emitter assembly 118, as described above with respect to FIG. 1. For example, a test signal may be periodically generated by the light emitter assembly 210. The sensor lens 204 may transmit the test signal to a light sensor within the sensor housing 206, such as the light sensor 112. In this embodiment, the light emitter assembly 210 may have a rectangular prism shape. The light emitter lens 214 may be arranged to project light horizontally toward the sensor lens 204. In other embodiments, a light emitter assembly may have a different shape.

As further shown in FIG. 2B, the sensor lens 204, while having a cylindrical structure, may include a cylinder portion 220 adjacent the sensor housing 206, as well as a dome structure 222 on a distal portion of the cylindrical structure away from the sensor housing 206. The sensor lens 204 may be composed of a plastic or glass material transparent to light over a wavelength range covering the wavelength of light emitted by the light emitter assembly 210, as well the wavelength range of light emitted in an arc flash. In some embodiments, the sensor lens 204 may be hollow, and may have a variable wall thickness. For example, the sensor lens 204 may have a greater wall thickness towards the dome structure 222 as compared to a wall thickness in the cylinder portion 220. The sensor lens 204 may be arranged to collect light from a range of angles of incidence, as detailed below with respect to additional embodiments. Although the embodiments described below show sensor lenses having a generally cylindrical structure, in further embodiments, a sensor lens may have a dome structure, conical structure, or other structure.

FIG. 3A is perspective view of an arc flash sensor apparatus according to embodiments of the present disclosure while FIG. 3B is a side view of the arc flash sensor apparatus of FIG. 3A. In particular, an arc flash sensor 302 is shown, coupled to a signal line 308. The arc flash sensor 302 may include a sensor housing 306, where the sensor housing 306 is formed by a molding process. The embodiments are not limited in this context. The sensor housing 306 may include a light sensor as described above with respect to FIG. 1, where the light sensor is used to detect an arc flash. The arc flash sensor 302 further includes a sensor lens 304 disposed on the outside of the sensor housing 306. The sensor lens 304, in this embodiment, may have a cylindrical shape, and may generally have similar properties and shape as described above for sensor lens 204. The arc flash sensor 302 further includes a light emitter assembly 310 disposed outside the sensor housing 306. The light emitter assembly 310 is disposed on a same side of the sensor housing 306 as the sensor lens 304 and in a line-of-sight relationship with the sensor lens 304. The light emitter assembly 310 may include a light emitting diode with the light emitter housing 312 as described above with respect to FIG. 1. The light emitter assembly 310 may include a light emitter lens 314 facing the sensor lens 304. The light emitter assembly 310 may function as described with respect to light emitter assembly 118 as described above with respect to FIG. 1. For example, a test signal may be periodically generated by the light emitter assembly 310. The sensor lens 304 may transmit the test signal to a light sensor within the sensor housing 306, such as the light sensor 112. In this embodiment, the light emitter assembly 210 may have a generally rectangular prism shape, with a beveled top portion housing the light emitter lens 314. The light emitter lens 314 may be arranged to project light at a downward angle toward a cylindrical portion 320 on a side of the sensor lens 204 facing the light emitter lens 314.

Figure 4A:
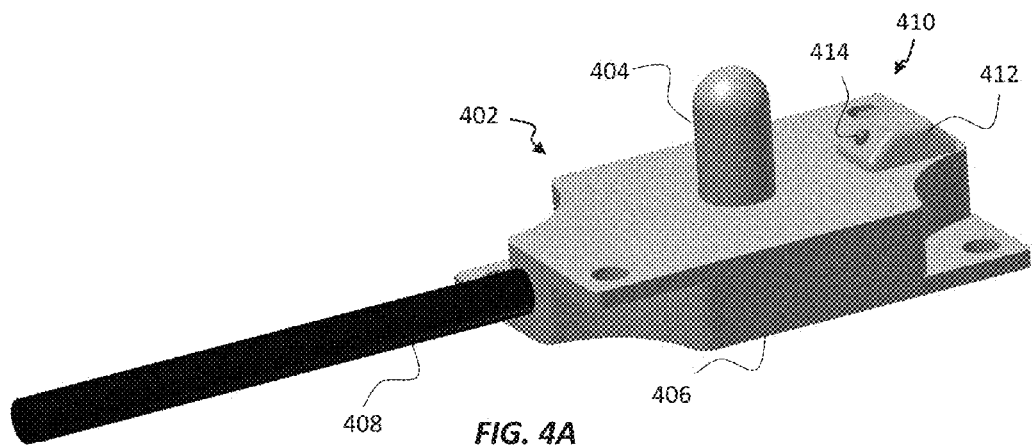
FIG. 4A is perspective view of a further arc flash sensor apparatus according to embodiments of the present disclosure.
Figure 4B:
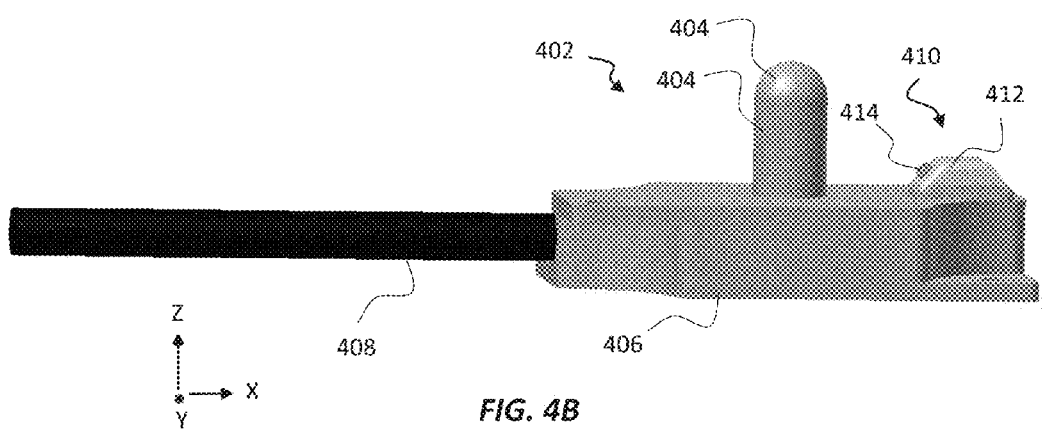
FIG. 4B is a side view of the arc flash sensor apparatus of FIG. 4A.

FIG. 4A is perspective view of an arc flash sensor apparatus according to further embodiments of the present disclosure while FIG. 4B is a side view of the arc flash sensor apparatus of FIG. 4A. In particular, an arc flash sensor 402 is shown, coupled to a signal line 408. The arc flash sensor 402 may include a sensor housing 406, where the sensor housing 406 is formed by a molding process. The embodiments are not limited in this context. The sensor housing 406 may include a light sensor as described above with respect to FIG. 1, where the light sensor is used to detect an arc flash. The arc flash sensor 402 further includes a sensor lens 404 disposed on the outside of the sensor housing 406. The sensor lens 404 in this embodiment may have a cylindrical shape, and may generally have similar properties and shape as described above for sensor lens 204 or sensor lens 304. The arc flash sensor 402 further includes a light emitter assembly 410 disposed outside the sensor housing 406. The light emitter assembly 410 is disposed on a same side of the sensor housing 406 as the sensor lens 404 and in a line-of-sight relationship with the sensor lens 404. The light emitter assembly 410 may include a light emitting diode with the light emitter housing 412 as described above with respect to FIG. 1. The light emitter assembly 410 may include a light emitter lens 414 facing the sensor lens 404. The light emitter assembly 410 may function as described with respect to light emitter assembly 118 as described above with respect to FIG. 1. For example, a test signal may be periodically generated by the light emitter assembly 410. The sensor lens 404 may transmit the test signal to a light sensor within the sensor housing 406, such as the light sensor 112. In this embodiment, the light emitter assembly 410 may have a generally trapezoidal prism shape, with a beveled top portion housing the light emitter lens 414. The light emitter lens 414 may be arranged to project light at an upward angle toward a cylindrical portion 420 on a side of the sensor lens 404 facing the light emitter lens 414.

Figure 5A:
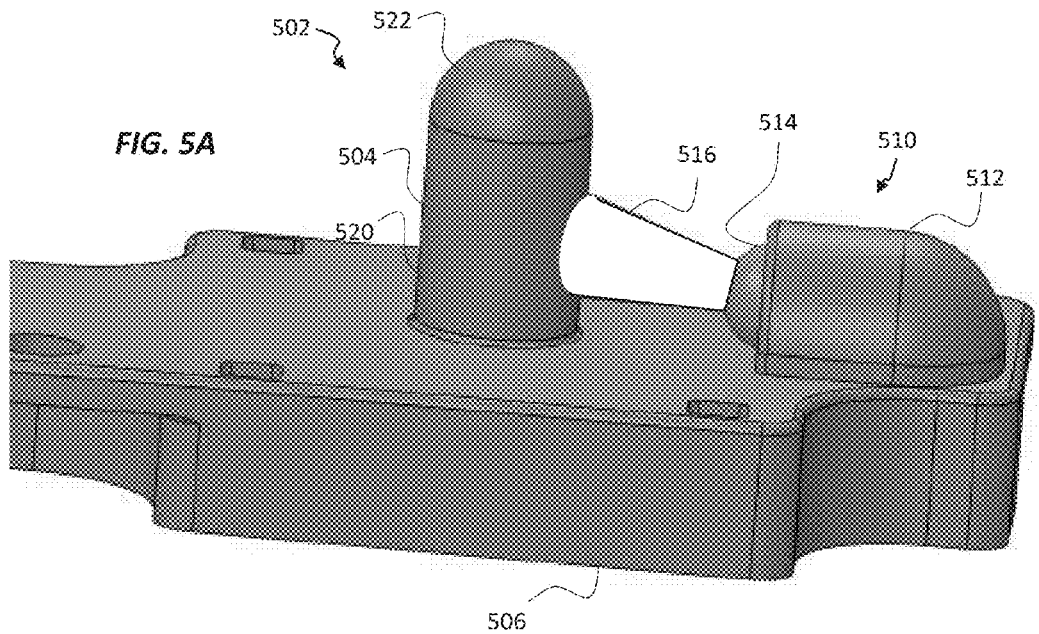
FIG. 5A is perspective view of an additional arc flash sensor apparatus according to embodiments of the present disclosure.
Figure 5B:
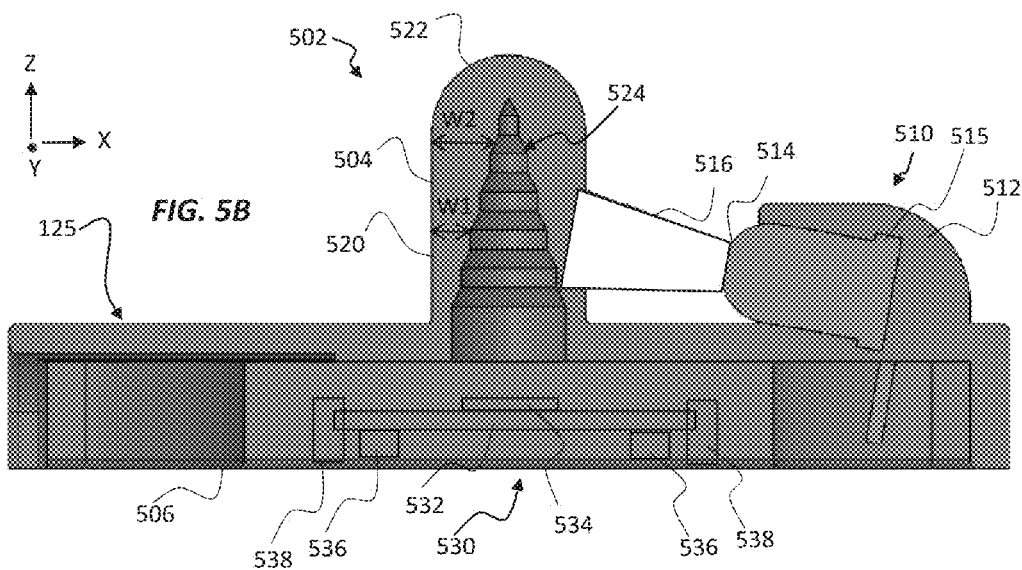
FIG. 5B is a side cross-sectional view of the arc flash sensor apparatus of FIG. 5A.

FIG. 5A is perspective view of an additional arc flash sensor apparatus according to embodiments of the present disclosure while FIG. 5B is a side cross-sectional view of the arc flash sensor apparatus of FIG. 5A.

In particular, as shown in FIG. 5A, an arc flash sensor 502 is shown. The arc flash sensor 402 may include a sensor housing 506, where the sensor housing 506 is formed by a molding process. The embodiments are not limited in this context. As shown in FIG. 5B, the sensor housing 506 may include a light sensor 534 as described further below. The arc flash sensor 502 further includes a sensor lens 504 disposed on the outside of the sensor housing 506. The sensor lens 504 in this embodiment may have a cylindrical shape, and may generally have similar properties and shape as described above for sensor lens 204 or sensor lens 304, or sensor lens 404. The arc flash sensor 502 further includes a light emitter assembly 510 disposed outside the sensor housing 506. The light emitter assembly 510 is disposed on a same side of the sensor housing 506 as the sensor lens 504 and in a line-of-sight relationship with the sensor lens 504. The light emitter assembly 510 may include a light emitting diode with the light emitter housing 512 as described above with respect to FIG. 1. The light emitter assembly 510 may include a light emitter lens 514 facing the sensor lens 504. In this embodiment, a light emitting diode 515 and light emitter lens 514 may be integrated into a common structure. The light emitter assembly 510 may function generally as described with respect to light emitter assembly 118 as described above with respect to FIG. 1. For example, a test signal may be periodically generated by the light emitter assembly 510. The sensor lens 504 may transmit the test signal to the light sensor 534 disposed below the sensor lens 504. In this embodiment, the light emitter assembly 510 may have a partially cylindrical shape, where the light emitter lens 514 is arranged to project light 516 at an upward angle toward a cylindrical portion 520 on a side of the sensor lens 504 facing the light emitter lens 514.

As further shown in FIG. 5B, the sensor lens 504 may have a hollow structure, where sensor lens 504 has an inner surface 524 having a tapered structure. In some embodiments the tapered structure may include a series of cylinders alternating with truncated cones as shown in FIG. 5B. The embodiments are not limited in this context. As shown in FIG. 5B the sensor lens 504 may have a cylindrical structure having a first wall thickness, shown as W1 in a first region and has a second wall thickness in a second region, shown as W2, where the second wall thickness is greater than the first wall thickness. Notably, the first region being is disposed closer to the sensor housing than the second region. Thus, the wall thickness of the sensor lens 504 may decrease from the dome portion 522 away from the sensor housing 506 to portions closer to the sensor housing 506. The sensor lens 504 accordingly has the lowest attenuation to low-angle light signals received along the bottom of the cylindrical portion 520 adjacent the sensor housing 506. This lower attenuation may compensate for the lesser sensitivity of the light sensor 534 towards light incident on the sensor lens form the sides having horizontal trajectories, or upward trajectories, such as the light 516.

As further shown in FIG. 5B, the light sensor 534 may be mounted on a printed circuit board 532, itself arranged upon standoffs 536 and held in place by snap mounts 538.

In various embodiments, the sensor lens and light sensor may be arranged to generate a flat angular characteristic for an entire arc flash sensor, meaning a beam of light incident from any angle gives the same response from the light sensor. For example, the light sensor 534 may be a photovoltaic chip arranged along a horizontal at a first position within the sensor housing 506, wherein a first light beam received at a first angle with respect to the horizontal generates a first intensity in the light sensor 534 equal to a second intensity generated in the light sensor 534 when a second light beam is received at a second angle different than the first angle.

Figure 6:
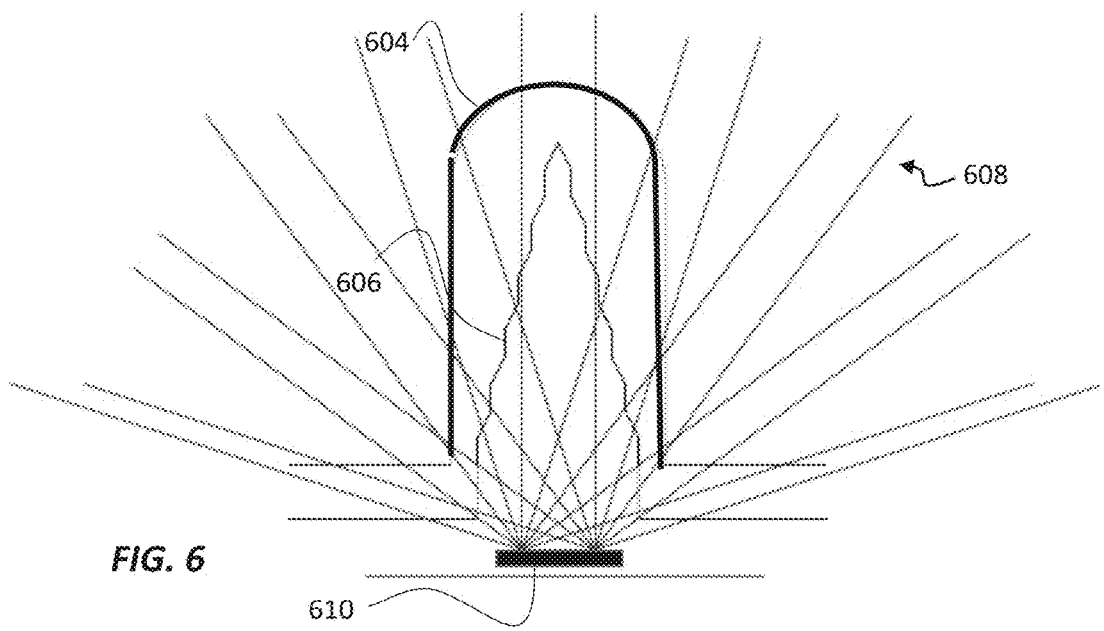
FIG. 6 depicts geometry of light collection of a sensor lens accordingly to embodiments of the present disclosure.

FIG. 6 depicts geometry of light collection of a sensor lens accordingly to embodiments of the present disclosure, showing an example of a flat angular characteristic. In this example, a cross section of the sensor lens 604 is shown. The sensor lens 604 may have a cylinder-and-dome structure as generally described above with respect to the embodiments of FIGS. 2A-5B. In this example, the sensor lens 604 has an inner surface 606 generally similar to the inner surface 524 discussed above. Light beams 608 are shown distributed over a range of angles of incidence from vertical to glancing angles, where the vertical may represent a cylinder axis of the sensor lens 604 that extends along a perpendicular to the surface 125 (see FIG. 1) of the sensor housing. Because the inner surface 606 of the sensor lens 604 has a stepped surface, light incident from various angles may be refracted down towards a light sensor 610, where intensity of light detected at different angles is the same. In some embodiments, the sensor lens 604 is arranged to generate uniform intensity at the light sensor for light incident on the sensor lens over a 360 degree range of angles with respect to the cylinder axis. For example the sensor lens 604 may be arranged to generate uniform intensity at the light sensor 610 for light incident on the sensor lens 610 over a 360 degree range of angles with respect to the cylinder axis at a fixed angle of incidence with respect to a plane of a sensor housing (See surface 125 of FIG. 1, or FIG. 5B, representing a plane of the sensor housing 110, 506, respectively).

In particular embodiments the sensor lens 604 may generate a first intensity at the light sensor 610 for light received over a range of angles of incidence of +/−60 degrees with respect to the cylinder axis, wherein the first intensity lies between +/−10% of a second intensity of light received along the cylinder axis.

Figure 7A:
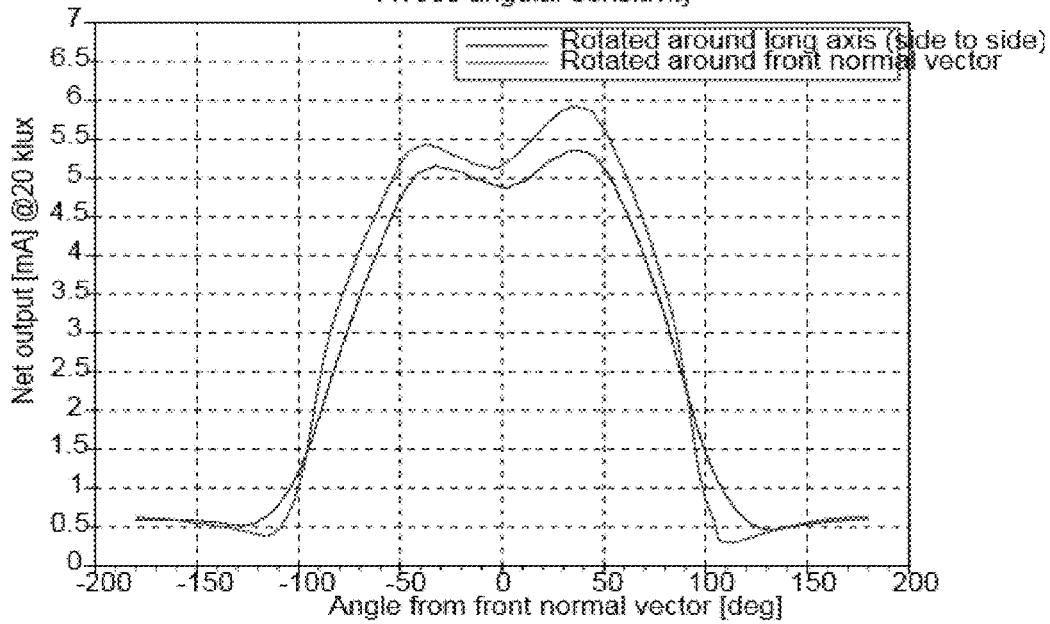
FIG. 7A depicts exemplary y curves illustrating current output as a function of angle for an apparatus according to embodiments of the disclosure.

FIG. 7A depicts exemplary y curves illustrating current output as a function of angle for an apparatus according to embodiments of the disclosure. In this example, the current output represents current output from a light sensor and is directly proportional to intensity of detected light. Two curves are shown as a function of incidence angle with respect to a cylinder axis of the sensor lens as described above. A first curve is along a first direction parallel to the X-axis as shown in FIG. 1, while a second curve is along a second direction parallel to the Y-axis as shown in FIG. 1.

Figure 7B:
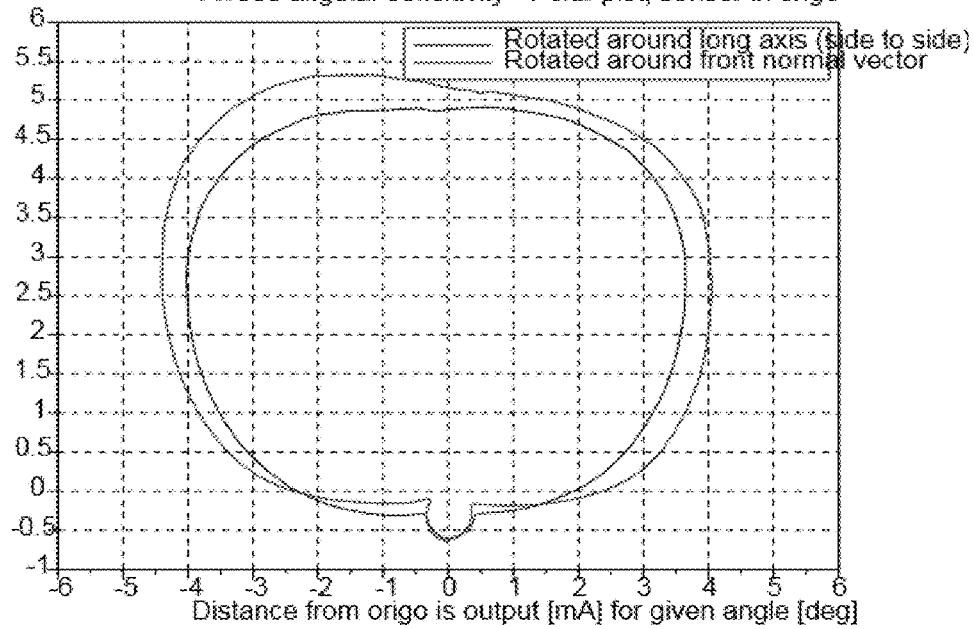
FIG. 7B depicts exemplary polar plots illustrating current output as a function of angle for an apparatus according to embodiments of the disclosure.

FIG. 7B depicts exemplary polar plots illustrating current output as a function of angle for an apparatus according to embodiments of the disclosure. In particular, FIG. 7B is a polar plot of the same data as 7A, where the sensitivity to light from a particular direction is plotted as a point at a distance depending on the sensitivity, and with an angle identical to the direction of the light. The sensor can be thought as placed at the coordinates 0,0. The two plots in the diagram are around the Y-axis and X-axis, respectively. An ideal sensor has a perfect spherical or half-spherical characteristic in two mutually perpendicular dimensions, appearing as circular shapes in the view of FIG. 7B. As used herein, references to "an embodiment," "an implementation," "an example," and/or equivalents is not intended to be interpreted as excluding the existence of additional embodiments also incorporating the recited features.

While the present disclosure has been made with reference to certain embodiments, numerous modifications, alterations and changes to the described embodiments are possible while not departing from the sphere and scope of the present embodiments, as defined in the appended claim(s). Accordingly, the present disclosure is not to be limited to the described embodiments, but rather has the full scope defined by the language of the following claims, and equivalents thereof.

The invention claimed is:

1. An apparatus, comprising:
    a sensor housing;
    a light sensor disposed within the sensor housing, the light sensor arranged to generate a detection signal when light impinges on the light sensor;
    a sensor lens disposed at least partially outside the sensor housing, wherein a distal portion of the sensor lens extends a first distance above the sensor housing, the sensor lens being transparent, wherein light received from outside the sensor housing is transmitted to the light sensor; and
    a light emitter assembly disposed outside the sensor housing, and arranged to extend a second distance above the sensor housing less than the first distance.

2. The apparatus of claim 1, further comprising:
    a signal line disposed at least partially within the sensor housing and coupled to the light sensor, the signal line to receive the detection signal and transmit the detection signal as an electric current; and
    a relay connected to the signal line and having a shutoff component to terminate conduction through an external conduction line when value of the detection signal exceeds an arc flash detection threshold.

3. The apparatus of claim 1, wherein the light emitter assembly comprises:
    a light emitter housing;
    a light emitting diode arranged to generate light as a test signal; and
    a light emitter lens disposed on the light emitter housing and transparent to light emitted as a test signal, wherein the test signal is transmitted through the light emitter lens.

4. The apparatus of claim 3, wherein the light emitter lens is disposed in a line-of-sight relationship with the sensor lens, wherein the test signal is transmitted by the sensor lens to the light sensor.

5. The apparatus of claim 3, further comprising a circuit check arrangement having a test signal component to cause the light emitter assembly to periodically emit the test signal; and
    a failure component to generate a failure signal when an intensity of light from the test signal detected by the light sensor falls below a threshold value.

6. The apparatus of claim 1, wherein the sensor lens comprises a cylindrical structure having a cylinder axis extending along a perpendicular to a surface of the sensor housing.

7. The apparatus of claim 6, wherein the sensor lens comprises a dome structure on a distal portion of the cylindrical structure away from the sensor housing.

8. The apparatus of claim 6, wherein the sensor lens comprises an inner surface, the inner surface having a tapered structure, wherein the cylindrical structure has a first wall thickness in a first region and has a second wall thickness in a second region greater than the first wall thickness, the first region being disposed closer to the sensor housing than the second region.

9. The apparatus of claim 8, wherein the inner surface is arranged to refract light incident from a side of the cylindrical structure downwardly toward the light sensor.

10. The apparatus of claim 6, wherein the light sensor comprises a photovoltaic chip arranged along a horizontal at a first position within the sensor housing, wherein a first light beam received at a first angle with respect to the horizontal generates a first intensity in the light sensor equal to a second intensity generated in the light sensor when a second light beam is received at a second angle different than the first angle.

11. The apparatus of claim 6, wherein the sensor lens is arranged to generate a first intensity at the light sensor for light received over a range of angles of incidence of +/−60 degrees with respect to the cylinder axis, wherein the first intensity lies between +/−10% of a second intensity of light received along the cylinder axis.

12. The apparatus of claim 6, wherein the sensor lens is arranged to generate uniform intensity at the light sensor for light incident on the sensor lens over a 360 degree range of angles with respect to the cylinder axis at a fixed angle of incidence with respect to a plane of the housing.

13. An arc flash protection device, comprising:
    an arc flash relay having a receiving component to receive a detection signal and a shutoff component to terminate conduction through a conduction line when a value of the detection signal exceeds a threshold; and
    an arc flash sensor, comprising:
        a sensor housing;
        a light sensor disposed within the sensor housing, the light sensor arranged to generate the detection signal when light impinges on the light sensor;
        a sensor lens disposed at least partially outside the sensor housing, wherein a distal portion of the sensor lens extends a first distance above the sensor housing, the sensor lens being transparent, wherein light received from outside the sensor housing is transmitted to the light sensor; and
        a light emitter assembly disposed outside the sensor housing and arranged to extend a second distance above the sensor housing less than the first distance.

14. The arc flash protection device of claim 13, wherein the light emitter assembly comprises:
    a light emitter housing;
    a light emitting diode arranged to generate light as a test signal; and
    a light emitter lens disposed on the light emitter housing and transparent to light emitted as a test signal, wherein the test signal is transmitted through the light emitter lens.

15. The arc flash protection device of claim 13, further comprising:
    a circuit check arrangement having a test signal component to cause the light emitter assembly to periodically emit the test signal; and
    a failure component to generate a failure signal when an intensity of light from the test signal detected by the light sensor falls below a threshold value.

16. The arc flash protection device of claim 13, wherein the sensor lens comprises a cylindrical structure having a cylinder axis extending along a perpendicular to a surface of the sensor housing.

17. A method of protecting a component against an arc flash, comprising:
    providing a light sensor within a sensor housing, the light sensor arranged to generate a detection signal when light impinges on the light sensor;
    providing a sensor lens at least partially outside the sensor housing, wherein a distal portion of the sensor lens extends a first distance above the sensor housing, the sensor lens being transparent, wherein light received from outside the sensor housing is transmitted to the light sensor;

providing a light emitter outside the sensor housing, the light emitter extending a second distance above the sensor housing less than the first distance; and generating a test signal from the light emitter, wherein the test signal is received by the light sensor.

18. The method of claim 17, further comprising providing the sensor lens comprises with an inner surface having a tapered structure, wherein the sensor lens has a first wall thickness in a first region and has a second wall thickness in a second region greater than the first wall thickness, the first region being disposed closer to the sensor housing than the second region.

19. The method of claim 17, further comprising:

causing the light emitter to periodically emit the test signal; and generating a failure signal when an intensity of light from the test signal detected by the light sensor falls below a first threshold value.

20. The method of claim 19, further comprising receiving a detection signal based upon light detected by the light sensor, and terminating conduction through a conduction line when a value of the detection signal exceeds a second threshold value.

* * * * *